May 19, 1959     M. KADISH     2,886,829
GASKET CONSTRUCTION FOR OUTLET FITTINGS FOR BATHTUBS AND THE LIKE

Filed Jan. 13, 1958

INVENTOR.
MAX KADISH
BY
Clark & Otto
ATTORNEYS

United States Patent Office 2,886,829
Patented May 19, 1959

2,886,829

GASKET CONSTRUCTION FOR OUTLET FITTINGS FOR BATHTUBS AND THE LIKE

Max Kadish, Scarsdale, N.Y., assignor to Savoy Brass Manufacturing Company, Inc., Long Island City, N.Y., a corporation of New York Application January 13, 1958, Serial No. 708,508

3 Claims. (Cl. 4—206)

This invention relates to an improved gasket construction and while not limited thereto, the same has particular reference to a gasket construction for use in an outlet fitting connecting a receptacle to a discharge pipe.

The invention contemplates a gasket construction which is constructed and arranged to overlie the edge portions of the connected parts of an outlet fitting so as to prevent direct contact of the parts.

Another object of the invention is to provide a gasket construction adapted for use in an overflow fitting connecting a receptacle such as a bathtub, sink, basin and the like with a drain pipe for carrying off liquids when the same reaches the height of the fitting.

Another object of the invention is to provide a gasket construction which extends over the edge of the overflow opening in the receptacle and overlies the inner and outer faces thereof adjacent the opening as well as covering the flange of the drain pipe to provide a leakproof connection and prevent marring of the faces of the receptacle by the tightening of the parts of the fitting.

Another object of the invention is to provide an overflow fitting having an improved gasket which effectively seals the joint between the outlet opening of a receptacle and the drain pipe and provides a resilient packing therebetween.

With the foregoing and other objects in view, reference is now made to the following specification and accompanying drawings in which the preferred embodiment of the invention is illustrated.

Figure 1:
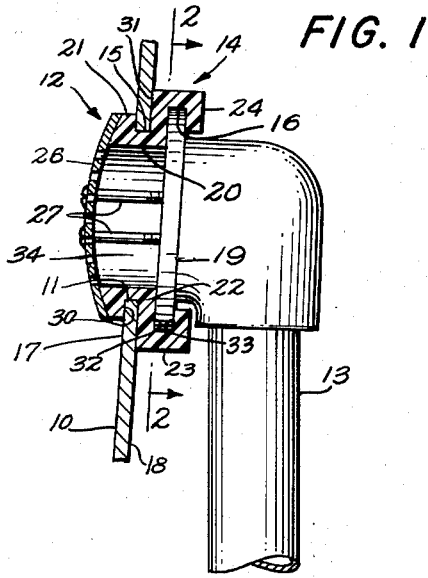
Fig. 1 is a sectional view through a fitting constructed in accordance with the invention and illustrating the same connecting a receptacle with a drain pipe with the receptacle and drain pipe fragmentarily shown.
Figure 2:
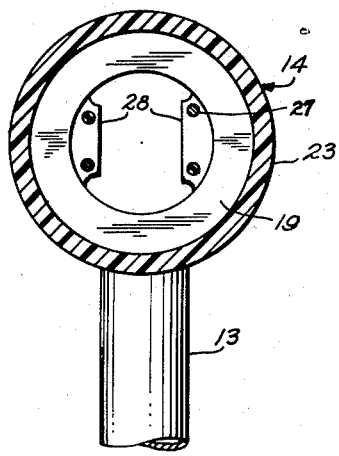
Fig. 2 is a sectional view taken approximately on line 2—2 of Fig. 1.
Figure 3:
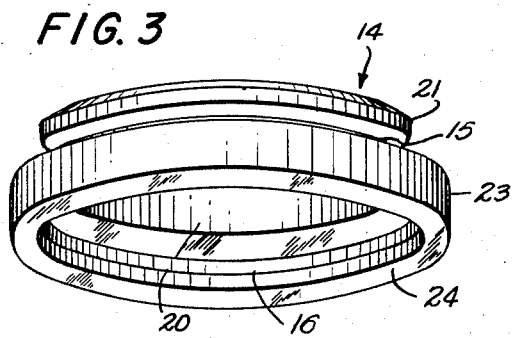
Fig. 3 is a perspective view of a gasket construction forming part of the fitting.

Referring to the drawings, a receptacle 10 is connected at an outlet opening 11 by a fitting 12 with a drain pipe 13. The outlet opening 11 may be located in any wall of the receptacle for carrying off the liquid and as illustrated, the opening is arranged in a wall of a receptacle such as a bathtub, sink, basin and the like so as to constitute an overflow for carrying off the liquid when the same reaches a predetermined level.

The fitting 12 includes a gasket 14 provided with annular recesses 15 and 16 which overlie the edge of the outlet opening 11 and the inner and outer faces 17 and 18 of the receptacle adjacent said opening as well as the flange 19 of the drain pipe so as to cover the connecting parts of the receptacle and drain pipe to thereby prevent direct contact thereof and provide a cushioning packing surrounding the said parts. The gasket is of annular formation and comprises a peripheral wall portion 20 having peripheral flanges 21 and 22 which are spaced apart to provide the annular recess 15 therebetween. The peripheral flange 21 is provided with an annular rim 23 having an inwardly directed internal flange 24 which is spaced from the flange 22 so as to provide the annular recess 16. The gasket is preferably of rubber composition or equivalent material to provide a flexible, resilient and deformable construction.

The gasket extends through the outlet opening 11 with the flange 21 disposed against the inner face 17 of the receptacle 10 in surrounding relation with the outlet opening and with the flange 22 disposed against the outer face 18 thereof with the wall of the tub at the outlet 11 snugly fitting the recess 15. The cylindrical wall portion 20 together with the flange 22 overlie the forward face of the flange 19 of the drain pipe and the inwardly directed flange 24 of the gasket overlies the rear face of the drain pipe flange with the flange snugly fitting in the recess 16.

The forward flange 21 of the gasket is covered by a foraminous plate 26 which is connected with the drain pipe fitting by screws 27 or equivalent fastening means threadedly engaged in threaded bosses 28 extending inwardly from the flange thereof.

It will be understood that the confronting side faces 30 and 31 of the flanges 21 and 22 are substantially parallel whereby the recess 15 is of substantially equal width throughout. The confronting side faces 32 and 33 of the flanges 22 and 24 are also substantially parallel so that the recess 16 therebetween is of substantially equal width throughout. Furthermore, the several flanges and recesses are concentric with the axis extending centrally through the opening 34 provided by the peripheral wall portion 20.

While the preferred form of the invention has been shown and described herein, it is to be understood that the same is not so limited but shall cover and include any and all modifications of the invention which fall within the purview thereof.

What is claimed is:

1. A flexible resilient gasket of rubber composition in the form of an annulus comprising an annular wall having outwardly projecting flanges at the opposite ends thereof extending continuously about said annular wall and spaced apart to provide a narrow peripheral recess therebetween, the flange at one end of said annular wall having an annular rim at the outer periphery thereof extending axially beyond said annular wall away from said recess, said annular rim having an inwardly directed flange on the inner periphery thereof disposed in spaced parallel relation from said last mentioned flange and providing a recess extending continuously about the inner periphery of said rim between said last mentioned and said inwardly directed flanges, and said inwardly directed flange being narrower radially than said last mentioned flange.

2. In an outlet fitting for connecting a bathtub at the outlet thereof with the flange of a drain pipe, said fitting including a flexible resilient gasket of rubber composition and of annular formation including an annular wall having a peripheral flange at one end thereof and a peripheral flange at the opposite end of said annular wall extending outwardly in parallel relation with said first mentioned flange and providing a peripheral recess between said flanges, said second mentioned flange having an annular rim at the outer periphery thereof extending axially away from said first mentioned flange, said rim having an inwardly directed peripheral flange disposed in parallel relation with said second mentioned flange to provide a recess extending continuously about the inner periphery of said rim, said gasket engaging through the outlet in the bathtub with the edge portion surrounding the outlet disposed in said first mentioned recess and the flange of the drain pipe disposed in said second mentioned recess, a foraminous plate seated on said first mentioned flange and overlying the annular opening through said gasket, and means extending through said gasket connecting said plate with the drain pipe and compressing the gasket about the edge portion of the bathtub outlet and against the flange of said drain pipe.

3. In an outlet fitting for connecting a bathtub at the outlet thereof with the flange of a drain pipe, said fitting including a flexible resilient gasket of rubber composition and of annular formation including an annular wall having a peripheral flange at one end thereof and a peripheral flage at the opposite end of said annular wall extending outwardly in parallel relation with said first mentioned flange and providing a peripheral recess between said flanges, said second mentioned flange having an annular rim at the outer periphery thereof extending axially away from said first mentioned flange, said rim having an inwardly directed peripheral flange disposed in parallel relation with said second mentioned flange to provide a recess extending continuously about the inner periphery of said rim, said gasket engaging through the outlet in the bathtub with the edge portion surrounding the outlet disposed in said first mentioned recess and the flange of the drain pipe disposed in said second mentioned recess.

References Cited in the file of this patent

UNITED STATES PATENTS

| 1,110,947 | Lampert | Sept. 15, 1914 |
| 2,274,324 | Fisher | Feb. 24, 1942 |
| 2,721,332 | Smith | Oct. 25, 1955 |

FOREIGN PATENTS

| 119,704 | Australia | Mar. 12, 1945 |